United States Patent [19]
McClure

[11] Patent Number: 5,121,529
[45] Date of Patent: Jun. 16, 1992

[54] BURIAL SHELL AND METHOD OF MAKING

[76] Inventor: Wilbur F. McClure, 415 S. Plum St., Troy, Ohio 45373

[21] Appl. No.: 663,157

[22] Filed: Mar. 1, 1991

[51] Int. Cl.⁵ .............................................. A61G 17/00
[52] U.S. Cl. ............................................. 27/7; 27/35
[58] Field of Search ............................................. 27/7,35

[56] References Cited

U.S. PATENT DOCUMENTS

| | | | |
|---|---|---|---|
| 2,811,768 | 11/1957 | Axelson | 27/7 |
| 2,916,797 | 12/1959 | McCombs | 27/7 X |
| 3,353,238 | 11/1967 | Sieloff | 27/7 |
| 4,253,220 | 3/1981 | Work | 27/7 X |

FOREIGN PATENT DOCUMENTS

| | | | |
|---|---|---|---|
| 2003429 | 8/1971 | Fed. Rep. of Germany | 27/7 |
| 2044967 | 10/1971 | Fed. Rep. of Germany | 27/7 |

Primary Examiner—Richard E. Chilcot, Jr.
Attorney, Agent, or Firm—William Weigl

[57] ABSTRACT

A casket or burial vault is made of thermoplastic material, either by vacuum forming or injection molding, as two longitudinal half-shells which are joined along a parting line into a leakproof, integral shell.

14 Claims, 1 Drawing Sheet

U.S. Patent  June 16, 1992  5,121,529
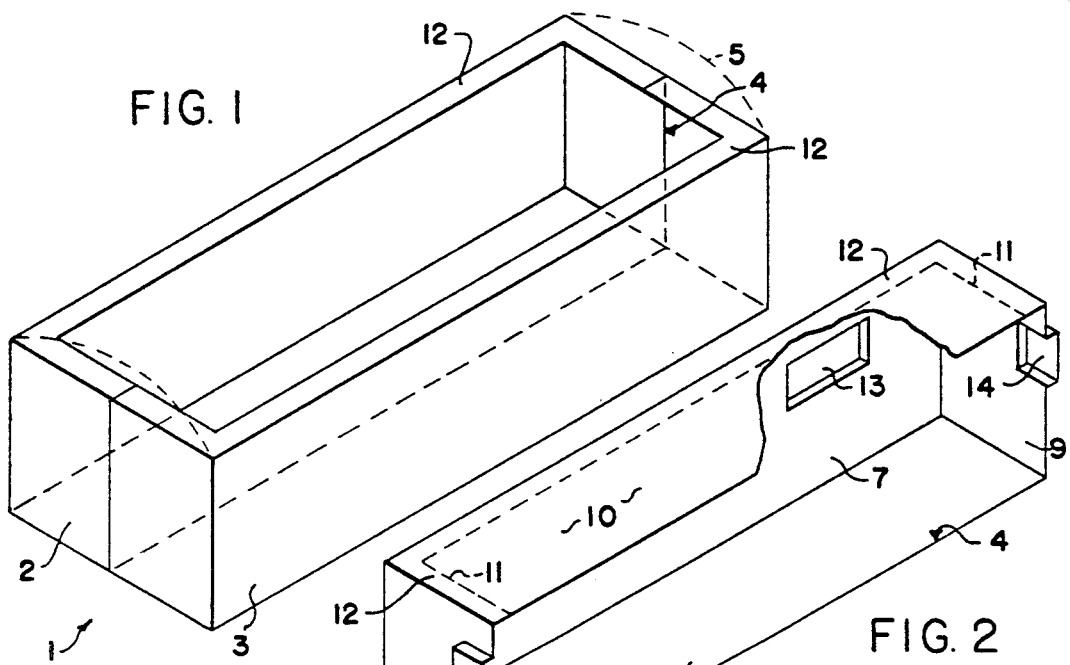
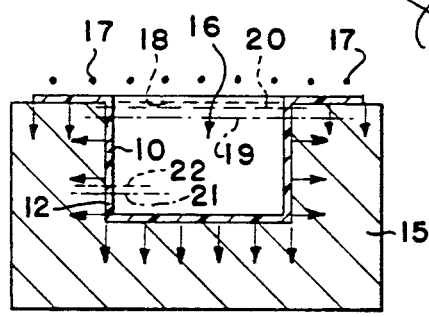
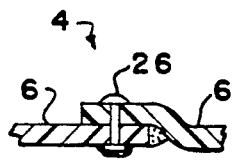
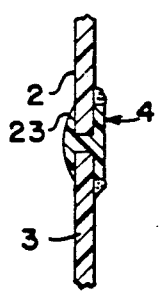
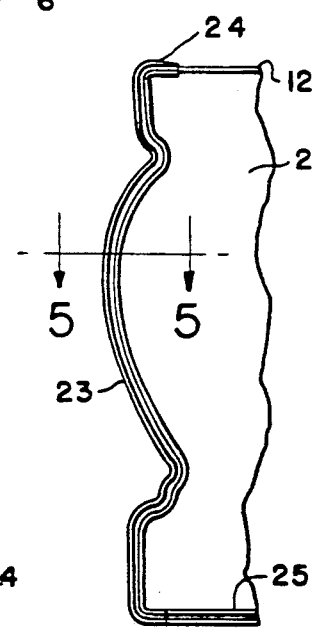

BURIAL SHELL AND METHOD OF MAKING

This invention relates generally to burial containers, and specifically to shells for caskets or burial vaults.

BACKGROUND OF THE INVENTION

Years ago, caskets were converted from wood to metal, and have remained essentially unchanged for the past fifty or more years, both as to construction and ornamental appearance. During the past few decades, several attempts have been made to reduce the weight of caskets by producing them from fiberglass. Such construction requires considerable handwork and has never made serious inroads in the marketplace.

Consideration has also been given to use of other materials such as molded sheets of asbestos cement as evidenced by U.S. Pat. No. 3,050,817, molded thermoplastic material such as in U.S. Pat. No. 3,353,238 and a continuous one-piece thermoformed sheet plastic as is illustrated in U.S. Pat. No. 3,487,513. Of these, the two molded types of caskets use those materials for the shell or lower, corpse-receiving part of the casket. The '513 patent uses the thermoformed material for the interior lining of the panel lid or cover for the shell. A similar result is achieved by U.S. Pat. No. 4,137,613 in which a head liner is specifically stated to be formed by utilizing the vacuum forming process. It is acknowleged that it would not be inventive to produce a casket lid by vacuum forming, since that is essentially what is achieved in the aforementioned '817 patent where the lid is produced as a single piece from asbestos cement. But to the best of my knowledge, there remains a need for a lightweight, leakproof casket which is capable of utilizing traditional ornamental designs made of relatively inexpensive materials and construction. Furthermore, there remains a need for such a casket which is easily produced in either a standard width or an extra-wide or oversized dimension for a large body.

Typically, burial vaults; i.e. the box in which caskets can be placed, are cast or molded of thick concrete walls. A concrete slab top or cover is placed over the casket. My construction for the casket as disclosed herein can be effectively used for vaults as well as caskets.

SUMMARY OF THE INVENTION

A burial shell, whether designed for use with either a casket or a vault, is made of two longitudinal half-shells which are divided essentially along a central, longitudinal parting line. The shell is made of thermoplastic material, preferably vacuum formed, but it may be injection molded. One side wall, one longitudinal half of the bottom and a half of each of two end walls are formed as a single, molded piece. The two halves are then joined and sealed along the parting line to provide an integral shell which becomes the basic structural, leakproof component of the casket or vault.

When producing the shells by vacuum forming, the same mold can be used to make a standard width casket or an extra wide or oversize casket for a large body. Various known types of joints can be used to make the unit structurally sound, esthetically pleasing and leakproof or watertight.

DESCRIPTION OF THE DRAWINGS

FIG. 1 is a simplified isometric view of a casket shell or an outer portion of a burial vault made according to my invention.

FIG. 2 is a simplified view similar to that of FIG. 1, illustrating a casket half-shell made by the vacuum forming process.

FIG. 3 is a cross-sectional elevational view of a vacuum forming mold with a half-shell having been produced therein.

FIG. 4 is a vertical cross-sectional view of one end of an urn-type casket, illustrating how a molded strip may be utilized to provide a pleasing appearance at the viewable ends of the casket along the parting line.

FIG. 5 is a view taken along lines 5—5 of FIG. 4, in which a butt joint is employed to join and seal the half-shells.

FIG. 6 shows another type of joint, one which is essentially telescoping, overlapping and riveted.

DESCRIPTION OF THE PREFERRED EMBODIMENT

Referring now to FIG. 1, a lower portion or shell 1 of a casket or burial vault comprises two half-shells 2 and 3 which are joined along a parting line 4 extending longitudinally of the shell 1. A lid or cover 5 is shown in dotted lines in FIG. 1 but does not constitute any portion of this invention. The cover will therefore not be described except to say that it is preferably of the same material as the shell, and, together with the shell provides a leakproof or watertight burial unit. The shell components are made of a thermoplastic material, preferably by vacuum forming as will be discussed later in connection with FIG. 3, but can also be made by conventional injection molding. While the invention is useful also in constructing burial vaults of the type which receive a casket, the description hereinafter will be primarily in conjunction with its use for a casket. Suffice it to say that since the half-shells 2 and 3 are produced from flat sheets about ¼ inch thick when vacuum formed, the half-shells 2 and 3, when used for burial vaults, would comprise only an outer shell portion of such a vault. A smaller-dimensioned inner portion could be similarly formed, and either the inner or outer shell portion would be provided with ribs spacing the portions apart when assembled. The vault would then take on the traditional appearance of a conventional concrete vault.

The remaining description will focus primarily on the casket version of the invention. FIG. 2 illustrates a vacuum formed half-shell 2' which has a bottom wall 6, a side wall 7 and a pair of end walls 8 and 9. Opposite the bottom wall 6 is a top wall 10 which is subsequently machined or routed along the dotted line 11 to provide a ledge 12 extending inwardly from the top edges of the walls 7, 8 and 9. The ledge 12 is also shown in FIG. 1 as being directed inwardly around the upper edge of the entire shell. The ledge provides structural rigidity to the box-like structure of the shell 1 while also providing an attaching and sealing surface between the lid 5 and shell 1 when the casket is closed. If the half-shells are produced by injection molding, that portion of the top wall other than the ledge 12 is not part of the molded piece.

Also shown in FIG. 2 are a pair of escutcheons 13 protruding outwardly from the side wall 7 and half-escutcheons 14 protruding outwardly adjacent the parting line 4. The escutcheons 13 and 14 are shown in simplified fashion in FIG. 2 and are typically found on conventional caskets as separate pieces of hardware. Such escutcheons can take various shapes, and often have the appearance of a shield or coat of arms to which handles (not shown) are affixed for enabling the casket to be carried. When a pair of half-shells are brought together along the parting line 4, the two half-escutcheons 14 on end walls 8 and 9 will span the parting line 4. If a carrying handle is attached to each of the joined half-escutcheons 14, this further assists in strengthening the casket when the half-shells form the full shell 1 into an integral structure.

FIG. 3 is a simplified view of a vacuum mold consisting of a lower mold section 15 into which a cavity 16 is provided in the shape of the exterior of the half-shells. Arrows shown in the mold section 15 illustrate the direction of vacuum drawing the heated thermoplastic material from which the casket is constructed against the walls of the cavity 16. The inner surfaces of the cavity may be smooth or be roughened to give a crinkled texture to the outside of the casket. Additionally, the thermoplastic material may be colored with any traditional casket coloring. The material is preferably a recycled thermoplastic of suitable members of the thermoplastic family. Preheating is provided by heating elements 17 positioned above the plastic sheets. The sheets span the cavity 16 as shown by the dotted lines 18 in FIG. 3. In customary vacuum forming fashion, once the sheet has been heated to a state at which it will lose its shape, the sheet is urged by a combination of gravity, vacuum and atmospheric pressure on the side of the sheet opposite the vacuum to cause the sheet to be pulled into the cavity 16 to form a half-shell. Once formed, the molded half-shell shown in FIG. 3 with edges of the sheet extending outwardly to the right and left from the cavity 16 is permitted to cool and assume the new shape given to it by the cavity contour. After cooling, the molded part is removed and cut, either along dot-dash line 19 for a standard-width casket or along dash line 20 for an oversize casket. It can be seen that by providing a mold 15 with sufficient cavity depth to make half-shells for both standard and oversize caskets, I can readily supply both standard-width caskets and caskets which are one or two inches wider than standard from the same mold. All known steel-constructed caskets have one-piece end walls which are stamped or otherwise formed in independent dies for each casket width. This not only requires extra tooling, but also necessitates having a separate inventory of both widths. When it is determined that either a standard width or oversize casket is to be produced, the ledge 12 is routed either along dot-dash line 21 or along the dash line 22, depending on which width casket is desired.

It is possible to achieve the results of my invention by injection molding with either a single mold if the two half-shells are designed to be identical, or with separate molds if they are different. Even if they are different, depending on the degree of difference, a single mold with separable parts can be used for molding different width caskets, as is obvious to persons familiar with injection molding.

For greatest cost efficiency, it is preferable for the two half-shells to be symmetrical and identical. This is not essential, however, and, depending upon the cost and desirability of having separate molds, the half-shells can be non-identical, particularly as to how the parting line is designed and constructed to provide greatest rigidity of the final shell along the parting line 4. In FIGS. 4 and 5, I show a butt joint for identical urn-style casket half-shells. The invention also contemplates being used in conjunction with square, round or mitre-cornered casket styles. For the casket ends, I provide a molded sealing strip 23 into which the butt edges along the parting line are inserted. A solvent/adhesive sealing compound is used to cement strip 23 and the butt ends of the half-shells together. The top inwardly-directed edge of the strip 23 is feathered as at 24 for esthetic reasons. The bottom wall may be provided with any of several types of sealed joints, including joint 25 which may also be of the type shown in FIG. 5.

An alternative type of joint is shown in FIG. 6. It includes overlapping or telescoping portions of bottom walls 6, connected by means of a series of rivets 26 extending the length of the parting line along the bottom of the casket. A sealing compound is applied to the facing surfaces of the joint of FIG. 6 prior to riveting. Whatever type of joint is employed, it should be one which gives both structural integrity to the shell 1 while also making it leakproof. This type of joint still enables use of a single mold for both half-shells, but they will not be symmetrical.

While the term half-shell is used in describing my invention, it would be obvious and considered to be within the scope of the invention to use shell portions which may not be true halves. Additionally, all half-shells could be of a single width and the difference for widening a casket to be standard or oversize could be achieved by making different width sealing strips for different casket widths.

Having described my invention, I claim:

1. In a burial shell having a generally flat rectangular, longitudinally-extending horizontal bottom having longitudinal and lateral edges, a pair of opposed side walls and a pair of opposed end walls extending generally vertically upwardly from the longitudinal and lateral edges of the bottom respectively, said walls and said bottom forming an open-top box-like structure adapted to sealingly receive a cover for enclosing said open top and thereby provide a leakproof burial structure, the improvement comprising:

said shell being produced from thermoplastic material as two substantially symmetrical, longitudinal half-shells, which, when assembled to form the box-like structure, have facing edges joined along a parting line extending generally longitudinally and centrally of the shell, said parting line being generally horizontal along the bottom of the shell and generally vertical along each of said end walls, and, means providing a sealed joint along the parting line to form said half-shells into an integral leakproof structure.

2. A shell according to claim 1 wherein the top edges of all of said walls are provided with horizontal ledges extending inwardly a short distance around the open top to provide structural integrity to said shell and to further provide a sealing surface with said cover.

3. A shell according to claim 1 wherein each half-shell is vacuum formed from an individual sheet of the thermoplastic material.

4. The invention according to claim 1 wherein said shell is a lower portion of a casket.

5. The invention according to claim 1 wherein the shell is a lower portion of a burial vault.

6. A shell according to claim 4 wherein the casket is provided with one or more escutcheons formed into the side walls and half-escutcheons formed into the end walls adjacent the parting line, which half-escutcheons, when the half-shells are joined, span the parting line to form complete escutcheons on the end walls.

7. A shell according to claim 1 wherein said half-shells are identical.

8. A shell according to claim 7 wherein the sealed joint comprises butt edges on the end walls of each half-shell, and wherein there is further provided an injection molded sealing strip which is adhesively connected to the butt edges of the end walls to form a portion of the sealed joint.

9. A shell according to claim 1 wherein each half-shell consists of injection molded material.

10. The invention according to claim 9 wherein said shell is a lower portion of a casket.

11. The invention according to claim 9 wherein the shell is a lower portion of a burial vault.

12. The shell of claim 1 wherein the sealed joint includes overlapping, telescoping edges.

13. The shell according to claim 7 wherein the half-shells have butt edges throughout the length of the parting line.

14. The shell of claim 1 wherein the material is recycled from a family of different thermoplastic materials.

* * * * *